United States Patent [19]
Tsuno et al.

[11] Patent Number: 4,810,870
[45] Date of Patent: Mar. 7, 1989

[54] SUN SENSOR WITH PERIODIC PATTERN RETICLE AND REFERENCE PHASE SIGNAL GENERATING MEANS

[75] Inventors: Katsuhiko Tsuno, Yokohama; Yoshihiko Kameda, Tokyo; Satoshi Akabane, Yokohama, all of Japan

[73] Assignee: Kabushiki Kaisha Toshiba, Kawasaki, Japan

[21] Appl. No.: 173,461

[22] Filed: Mar. 25, 1988

[30] Foreign Application Priority Data

Mar. 30, 1987 [JP] Japan ................................ 62-76661
Mar. 30, 1987 [JP] Japan ................................ 62-76662

[51] Int. Cl.⁴ .............................................. G01J 1/20
[52] U.S. Cl. ................................ 250/203 R; 356/141
[58] Field of Search ........... 250/203 R, 203 S, 237 G; 126/425; 356/141, 152

[56] References Cited

U.S. PATENT DOCUMENTS

3,515,594  12/1967  Samuels ........................... 250/203 R
4,286,760   9/1981  Couderc et al. ................. 250/203 R
4,410,270  10/1983  Zuckerman ........................ 356/141
4,560,870  12/1985  Ramamurti ...................... 250/237 G
4,593,187   6/1986  Grotts et al. .................... 250/203 R

Primary Examiner—David C. Nelms
Assistant Examiner—William L. Oen
Attorney, Agent, or Firm—Oblon, Fisher, Spivak, McClelland & Maier

[57] ABSTRACT

Sunlight passes through the light-transmission sections of a periodic pattern reticle of a sun sensor, and light components thus divided at regular intervals are incident on the light-receiving surface of a photoelectric converting section. The photoelectric converting section transfers charges stored in the light-receiving sections, in response to a pulse signal from a transfer pulse-generating section, to convert the light intensity distribution to a time series signal. A reference phase signal-generating section generates a reference phase signal whose polarity is inverted at an interval corresponding to the width and interval of the light-transmission sections, based on the pulse signal from the transfer pulse generator. An error voltage-detecting section multiplies the reference phase signal by the time series signal, and integrates the result of multiplication to detect an error voltage corresponding to the phase difference between the two signals. A sunlight incident-angle detecting section controls the phase-shift amount of the reference phase signal, based on the error voltage, so as to reduce the error voltage to "0". At this time, the phase-shift amount of the reference phase signal has a predetermined relation with respect to the incident angle of the sunlight.

10 Claims, 7 Drawing Sheets

SUN SENSOR WITH PERIODIC PATTERN RETICLE AND REFERENCE PHASE SIGNAL GENERATING MEANS

BACKGROUND OF THE INVENTION

1. Field of the Invention

This invention relates to a sun sensor for sensing the attitude of the artificial satellite, the inclination angle of the solar paddle, and so forth.

2. Description of the Related Art

Generally, an artificial satellite measures the incident angle of the sunlight by means of a sun sensor, and on the basis of such measurement, corrects its own attitude and inclination angle of the solar paddle. The following are known types of sun sensors which are currently installed in artificial satellites and which can measure the incident angle of the sunlight with high precision.

(1) An analog type sun sensor which uses a periodic pattern reticle (mask plate with a grid pattern).

(2) A digital type sun sensor made up of a combination of a CCD linear array sensor and a slit.

Figure 1:
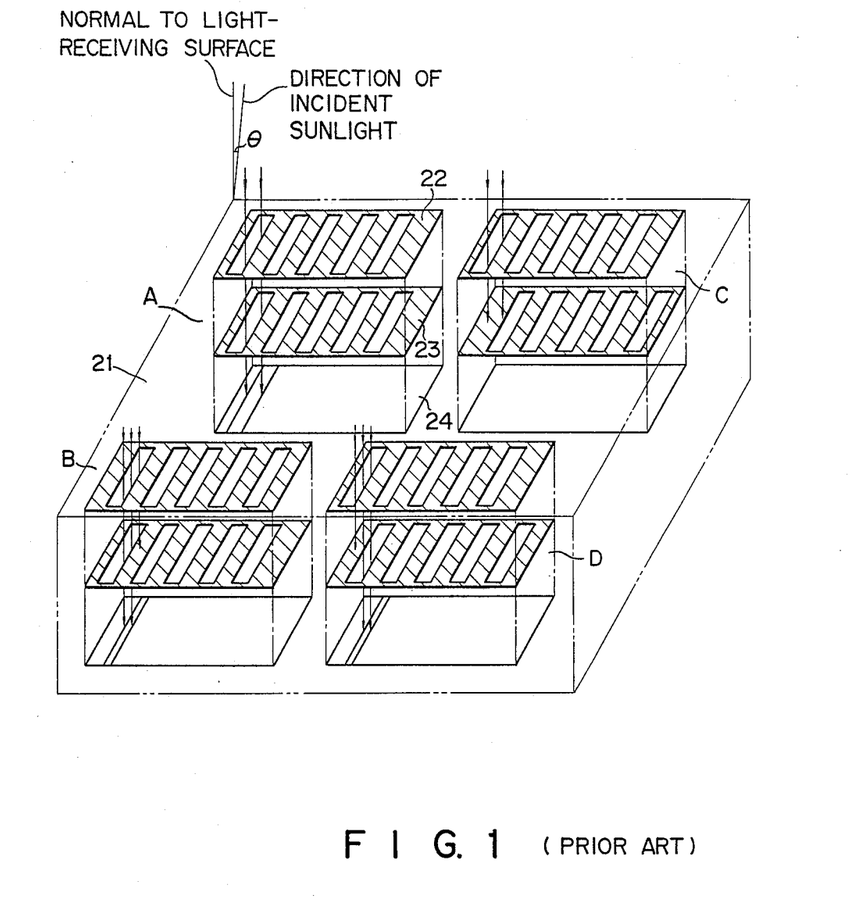
FIG. 1 being a perspective view showing the construction the head of the analog type sun sensor using a periodic reticle pattern.

As is shown in FIG. 1, the type (1) sun sensor has head 21 which has first to fourth light receiving sections A to D, each of which is formed of first and second reticles 22 and 23 and a photoelectric converting element (for example, a solar cell) 24. Each of reticles 22 and 23 has a periodic pattern of light transmission sections and shading sections which are provided in the bank-like form with a predetermined width and arranged in the same direction. The patterns of first reticle 22 in first to fourth light receiving sections A to D are displaced by 0°, 90°, 180° and 270°, respectively from those of second reticle 23 in the corresponding light receiving sections. Only the light which has passed through the light transmission sections of first and second reticles 22 and 23 of each of light receiving sections A to D can reach photoelectric converting element 24.

More precisely, sunlight S incident on head 21 at incident angle $\theta$ is partly interrupted or shaded by the shading sections of first reticle 22 and then reaches second reticle 23, the resulting light intensity distribution being expressed by function $f(\theta)$. In addition, sunlight S is also partly interrupted by the shading sections of second reticle 23 before reaching photoelectric converting element 24. Thus, current flowing in photoelectric converting element 24 can be expressed by function $g(\theta)$ which is a function of incident angle $\theta$ of sunlight S.

When the distance between first and second reticles 22 and 23 and the widths of the transmission sections and shading sections of respective reticles 22 and 23 are set to proper values, function $f(\theta)$ representing the light intensity distribution can be approximately expressed as follows by taking the diffusion and diffraction effect of the sunlight into consideration:

$$f(\theta) = \alpha + \beta \sin(\beta\theta)$$

($\alpha$, $\beta$ and $\gamma$ are constants)

Assume that current $g(\theta)$, generated when the sunlight expressed by function $f(\theta)$ is partly interrupted by reticle 23 and then received by photoelectric converting element 24, can be approximately expressed as follows:

$$g(\theta) = \alpha' + \beta' \sin(\Upsilon'\theta)$$

More precisely, since the patterns of first reticle 22 in first to fourth light receiving sections A to D are displaced by 0°, 90°, 180° and 270°, respectively from those of second reticle 23 in the corresponding light receiving sections, currents $g_A(\theta)$ to $g_D(\theta)$ generated in respective light receiving sections A to D of photoelectric converting element 24 are thus expressed as follows:

$$g_A(\theta) = \alpha' + \beta' \sin(\gamma'\theta)$$

$$g_B(\theta) = \alpha' + \beta' \cos(\gamma'\theta)$$

$$g_C(\theta) = \alpha' - \beta' \sin(\gamma'\theta)$$

$$g_D(\theta) = \alpha' - \beta' \cos(\gamma'\theta)$$

Figure 2:
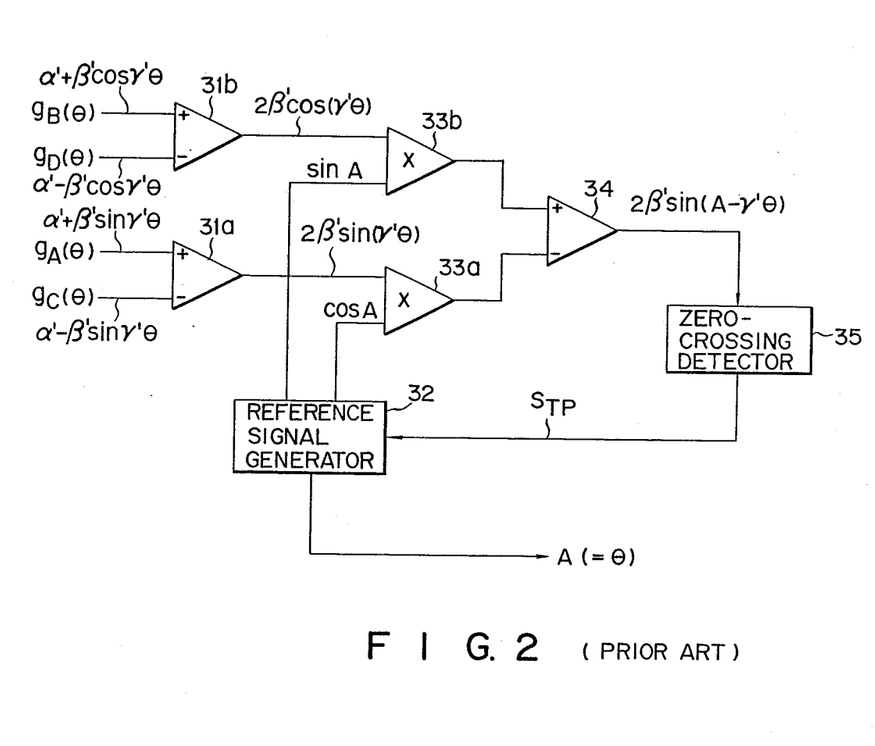
FIG. 2 being a block diagram showing the construction of an operational circuit section of the analog type sun sensor.

Current outputs $g_A(\theta)$ to $g_D(\theta)$ are supplied to an operation circuit section shown in FIG. 2, from where $g_A(\theta)$ and $g_C(\theta)$ are supplied to subtracter 31a which in turn supplies the following output:

$$g_A(\theta) - g_C(\theta) = \{\alpha' + \beta'\sin(\gamma'\theta)\} - \{\alpha' - \beta'\sin(\gamma'\theta)\}$$
$$= 2\beta'\sin(\gamma'\theta).$$

Outputs $g_B(\theta)$ and $g_D(\theta)$, on the other hand, are supplied to subtracter 31a which in turn supplies the following output:

$$g_B(\theta) - g_D(\theta) = \{\alpha' + \beta'\cos(\gamma'\theta)\} - \{\alpha' - \beta'\cos(\gamma'r)\}$$
$$= 2\beta'\cos(\gamma'\theta).$$

Reference signal generator 32 generates sine wave signal sinA and cosine wave signal cosA, used as reference signals, and A is gradually increased. Then, output $2\eta' \sin(\gamma'\theta)$ from subtracter 31a and cosine wave signal cosA are multiplied in multiplier 33a and output $2\beta' \cos(\theta'\theta)$ from subtracter 31b and sine wave signal sinA are multiplied in multiplier 33b. The resultant outputs from the multipliers are supplied to subtracter 34 which in turn supplies output $2\beta' \sin(A - \gamma'\theta)$ to zero-crossing detector 35. Zero-crossing detector 35 generates stop signal $S_{TP}$ each time the input signal crosses the zero level. Reference signal generator 32 stops changing A in response to stop signal $S_{TP}$, and produces A ($=\theta$) obtained at this time as an incident angle. Thus, incident angle $\theta$ can be derived.

However, with the construction as described above, the following problem will occur. The detection precision of incident angle $\theta$ is determined according to the degree to which function $f(\theta)$ representing the distribution of the light intensity obtained at the reticle can be approximated to the sine wave. In practice, however, since the sunlight has been diffused and is subjected to diffraction effect at the time of passing through the reticle, it becomes difficult to sufficiently approximate it to the sine wave. Thus, it seems impossible to further enhance the detection precision. Further, it is necessary to provide four sets of two reticles and one photoelectric converting element, increasing the size of the head.

Figure 3:
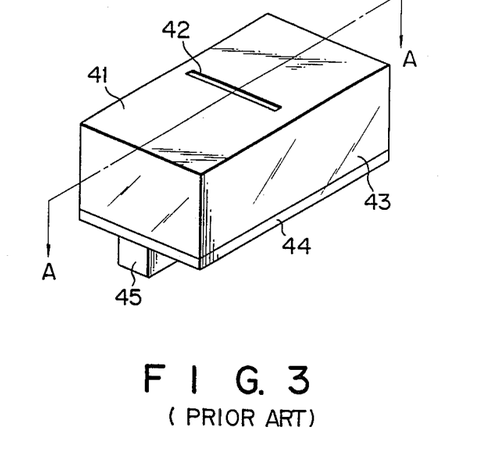
FIGS. 3 to 5 being diagrams showing the construction of the digital type sun sensor using a head which has a combination of a CCD linear sensor array and slit.
Figure 4:
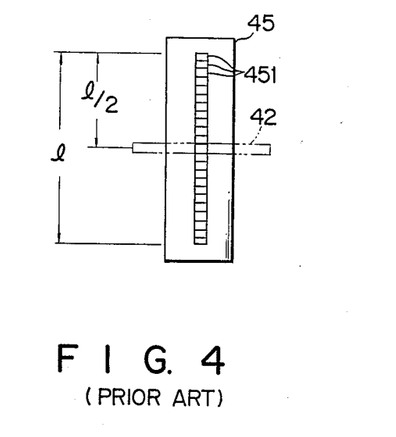
Figure 5:
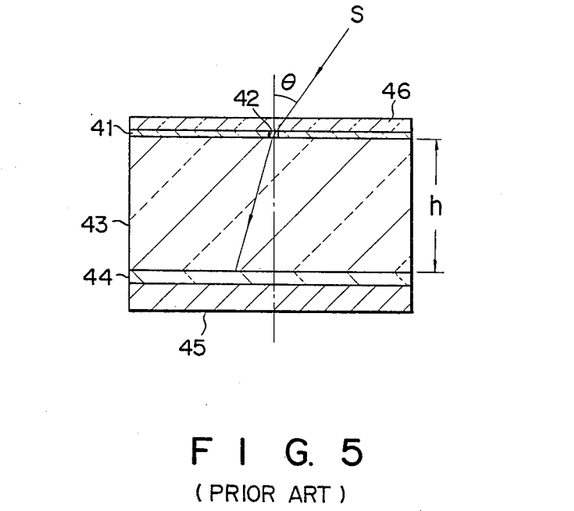

On the other hand, in the sun sensor of the type (2), slit 42 and CCD linear array sensor 45 are provided as main constituents as shown in FIGS. 3 to 5. FIG. 3 shows the construction of the head, FIG. 4 shows the positional relation between slit 42 and CCD linear array sensor 45, and FIG. 5 is a cross sectional view of the device shown in FIG. 3 taken along lines A—A. In FIGS. 3 to 5, 41 denotes a spectral prism, 44 a band pass filter for permitting transmission of only the light having a predetermined wave length, 451 a CCD light receiving element (picture element) and 46 a beam attenuation ND filter.

Figure 6:
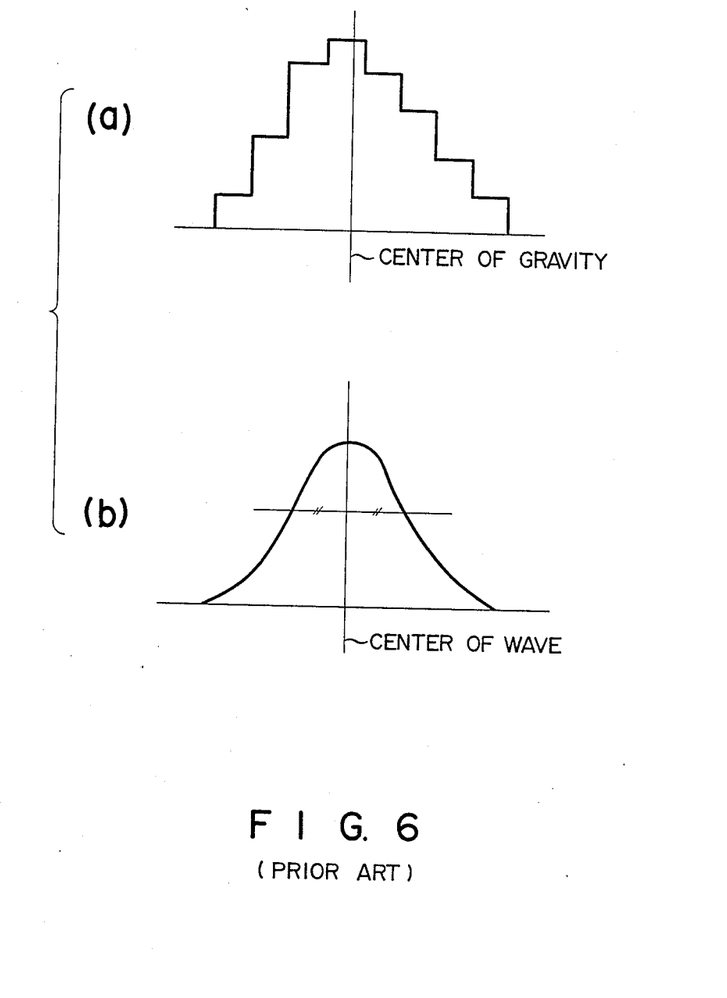
FIG. 6 being a diagram illustrating means for detecting a sunlight incident angle in the digital type sun sensor.

In the sun sensor described above, the position on the light receiving surface of CCD linear array sensor 45 to which sunlight S having passed through slit 42 is projected is detected based on an output of sensor 45 so as to derive the azimuth of the sun (incident angle of the sunlight) θ. In this type of sun sensor, the centroid is detected based on a signal generated from sensor 45 as shown in FIG. 6(*a*). Alternatively, the center of a wave obtained by filtering the output of sensor 45 is detected as shown in FIG. 6(*b*) to enhance the detection precision of the incident position of the sunlight on the light receiving surface of sensor 45.

However, in this type of sun sensor, an image made by sunlight S having passed through slit 42 is formed to range only several picture elements to several tens of picture elements, and therefore an output signal of sensor 45 is affected by partial irregularity of CCD light receiving elements (for example, variation in dark currents of the light receiving elements and difference in the sensitivity of the picture elements), making the ability of detecting the position irregular. In this case, uniform ability of position detection can be attained by setting distance h between slit 42 and sensor 45 large so as to enlarge the image made by sunlight S and reducing the maximum detection angle for each picture element or light receiving element. However, this increases the size and weight of the sensor and makes it impractical.

As described above, in the prior art sun sensor of the analog type using the periodic pattern reticle, the detection precision is determined by the diffusion and diffraction effect of the sunlight, and it seems impossible to further enhance the detection precision. The detection precision may be lowered by the error caused in the analog operation, and the problem of increasing the size of the head is caused. Further, in the digital type sun sensor having a combination of the CCD linear array sensor and slit, errors may be easily caused by the partial irregularity of the light receiving elements, and it is necessary to increase the size and weight of the sensor head in order to further enhance the detection precision.

SUMMARY OF THE INVENTION

An object of this invention is to provide a sun sensor capable of detecting the incident angle of the sunlight at a high precision without increasing the size of the head.

According to one aspect of this invention, there is provided a sun sensor comprising a periodic pattern reticle having a plurality of band-form light-transmission sections and a plurality of band-form light-shading sections which are arranged in alternate fashion, permitting the sunlight to pass through the light-transmission sections arranged at regular intervals; photoelectric converting means arranged under the reticle, to receive the sunlight which has passed through the light-transmission sections of the reticle, and including a plurality of light-receiving sections which are linearly arranged to store charges corresponding to the amount of received light; transfer pulse generating means for generating pulse signals to transfer the charges stored in the light-receiving sections of the photoelectric converting means; reference phase signal-generating means for generating a reference phase signal of a period corresponding to the width and intervals of the light-transmission sections, based on the pulse signal generated from the transfer pulse-generating means; and means for detecting the incident angle of the sunlight whereby the phase reference between the reference phase signal from the reference phase signal-generating means and the time series signal transferred and output from the photoelectric converting means is output from which the incident angle of the sunlight can be determined.

BRIEF DESCRIPTION OF THE DRAWINGS

FIGS. 1 to 6 are diagrams showing the prior art sun sensor;

FIGS. 7 to 9 are diagrams for illustrating a sun sensor according to one embodiment of this invention;

FIGS. 10 and 11 are diagrams illustrating another embodiment of this invention;

DETAILED DESCRIPTION OF THE PREFERRED EMBODIMENT

An embodiment of this invention will now be described, with reference to FIGS. 7 to 9.

Figure 7:
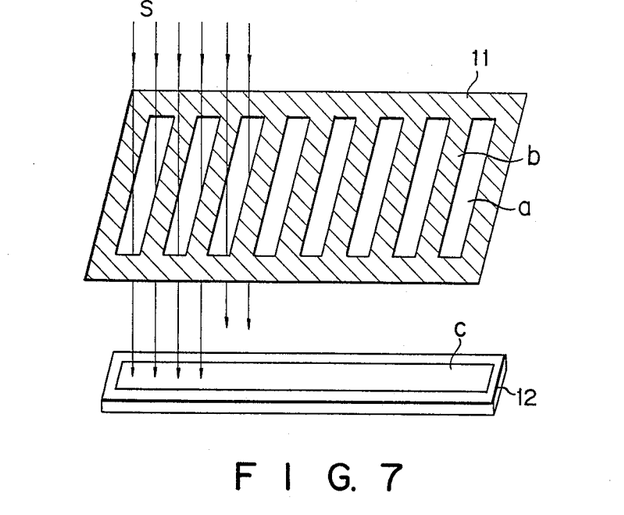
FIG. 7 being a perspective view showing the construction of a head.
Figure 8:
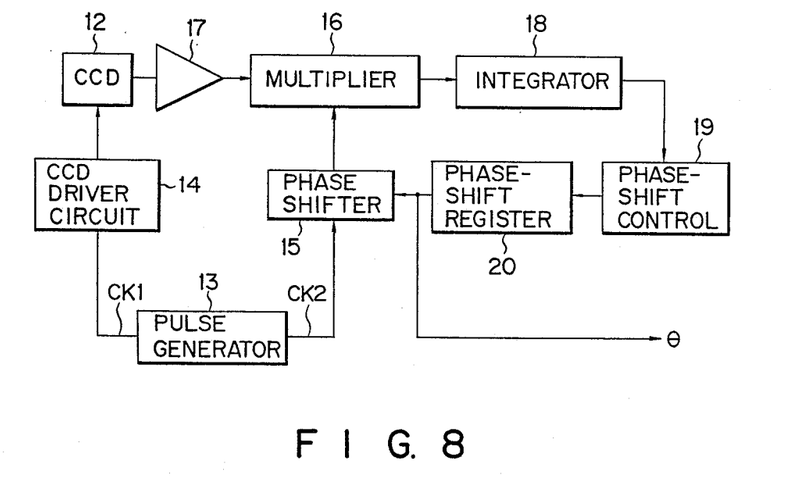
FIG. 8 being a block diagram showing the construction of a signal processing section.

FIG. 7 shows the construction of the head of a sun sensor according to this invention, and FIG. 8 shows the construction of a signal processing section thereof.

In FIG. 7, numeral 11 denotes a reticle including band-like light-transmission sections "a" and light-shading sections "b" of predetermined widths which are alternately arranged in the same direction so as to form a periodic pattern, and numeral 12 denotes a CCD linear array sensor having CCD light-receiving elements "c" arranged in a row. Sensor 12 is arranged under reticle 11, with the direction of the CCD array being coincident with the direction in which the pattern of reticle 11 extends.

Sunlight (at incident angle θ) is partly interrupted by light-shading sections "b" of reticle 1,, and only sunlight S which was allowed to pass through light-transmission sections "a" can reach the light-receiving surface of CCD linear array sensor 12 in the head employing the above-mentioned construction. Assume that the distance between reticle 11 and CCD linear array sensor 12 is H and that the incident angle of sunlight S is θ. This being so, the light intensity distribution on the CCD light receiving surface can be represented by the pattern shown in FIG. 9(*a*). In FIG. 9(*a*), x denotes a distance in the direction of the CCD array and t indicates a transfer time.

In FIG. 8, numeral 13 denotes a pulse generator for generating timing pulse CK1, for transferring and driving operations, and reference pulse CK2, which is in synchronism with timing pulse CK1 and is set to corresponding transmissivity "1" (positive) at light-transmission section "a" of reticle 11, and to transmissivity "0" (negative) at light-shading section "b" when incident angle θ of sunlight S is 0. Timing pulse CK1 is supplied to CCD linear array sensor 12 via CCD driver circuit 14, and reference pulse CK2 is subjected to phase-control by means of phase shifter 15 and then supplied to multiplier 16. A time series signal corresponding to the light intensity distribution is read out from CCD array sensor 12, in response to timing pulse CK1, and is supplied to multiplier 16, via amplifier 17, is multiplied by an output signal (hereinafter referred to as a replica signal) of phase shifter 15, integrated and converted to a D.C. signal by integrator 18, and finally, is supplied to phase-shift control 19. Phase-shift control 19 phase-controls an output signal of phase shifter 15, by an amount corresponding to the change in level of an input signal, by use of phase-shifting register 20. More precisely, phase-shifter 15, multiplier 16, integrator 18, phase-shift control 19 and phase-shifting register 20 are combined to constitute a PLL (phase-locked loop) circuit.

The circuit having this construction will now be explained below.

Figure 9:
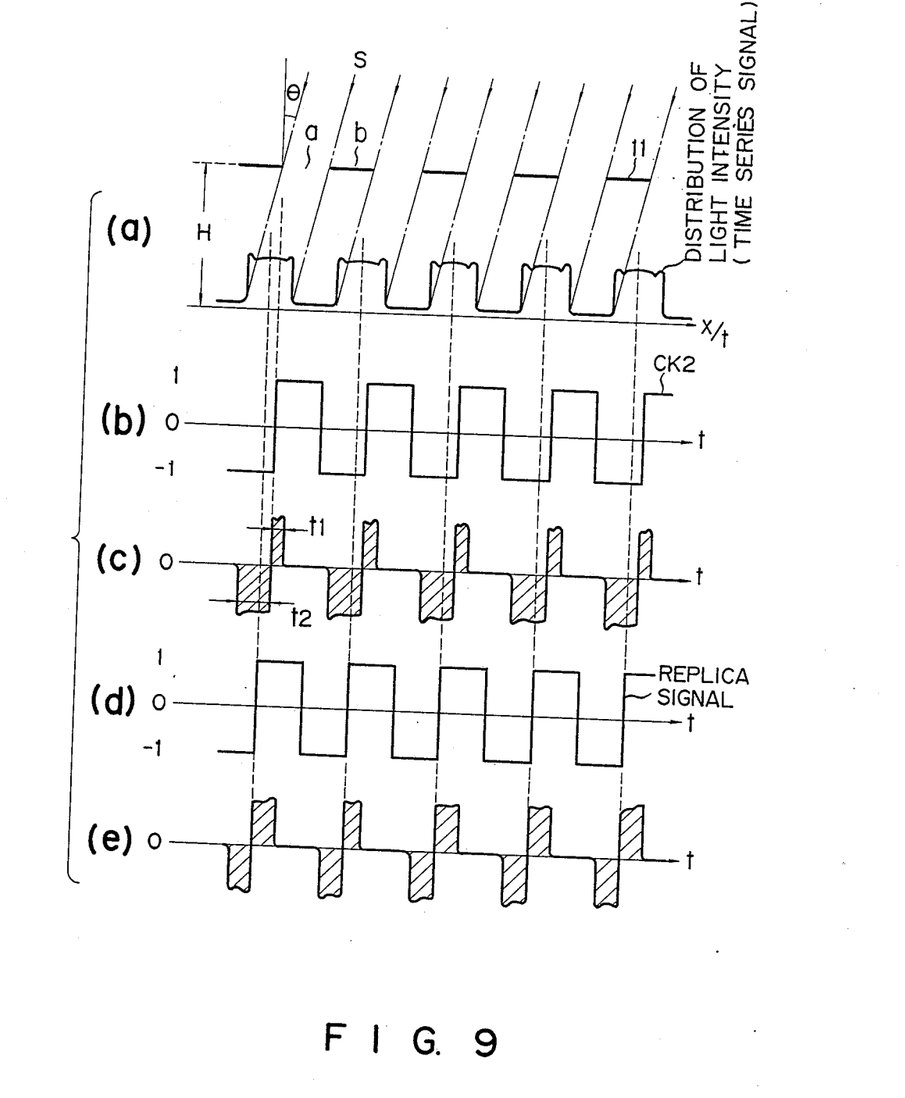
FIG. 9 being a diagram showing means for detecting an azimuth.

Reference pulse CK2 is generated with respect to the pattern of reticle 11 at such a timing such as is shown in FIG. 9(b). When a time series signal is multiplied by a replica signal, by means of multiplier 16, while the time series signal corresponding to the light intensity distribution shown in FIG. 9(a) is generated from CCD linear array sensor 12, a signal such as is shown in FIG. 9(c) can be obtained at an initial stage. As can be clearly seen from FIG. 9(c), an output signal of multiplier 16 has positive period t1 and negative period t2, which are changed according to incident angle θ. When the signal is integrated and smoothed by integrator 18, a voltage is obtained which is at "0" level at the time of t1=t2, positive at the time of t1>t2, and negative at the time of t1<t2.

The output voltage of integrator 18 is supplied as an error voltage to phase-shift control 19. Phase-shift control 19 controls the amount of phase shift of phase shifter 15, via phase shifting register 20, on the basis of the polarity and level of an input voltage. More precisely, the replica signal is phase-shifted as shown in FIG. 9(d), voltage integrated values obtained by integrating an output of multiplier 18 in positive period t1 and negative period t2 are set equal to each other, as is shown in FIG. 9(e), and an error voltage generated by integrator 18 is controlled so that it is "0". At this time, the rising of the replica signal appears at the center of the light-intensity distribution wave. Thus, the phase-shifting amount for phase shifter 15 is in proportion to incident angle θ of sunlight S.

More specifically, the correlated value between time series signal f(t) and replica signal g(t) can be expressed as follows:

$$C = \int f(t) \cdot g(t) dt$$

Thus, C can be derived by use of multiplier 16 and integrator 18. In other words, correlated value C relates to the phase difference between time series signal f(t) and replica signal g(t), and is "0" a phase difference of 90°, and becomes to positive or negative at a phase difference greater or smaller than 90°. FIGS. 9(b) and (c) indicate a case where the phase difference is greater than 90°, while FIGS. 9(d) and (e) respectively show a case where the phase difference is set to 90° and one where the phase error (correlated value C) is set to "0".

Since the sun sensor having the construction as described above controls the phase shift amount of phase shifter 15 so as to reduce to zero the difference between the phase-shift amounts of time series signal f(t) and replica signal g(t), information of the sun azimuth (incident angle) θ can therefore be derived on the basis of the phase-shift amount, and angle θ can be derived from the azimuth information. It is easy to control the phase shift amount of phase shifter 15 within a time shorter than that required for CCD linear array sensor 12 to generate an output signal of one full picture element, and therefore a sun sensor having a high precision and high position detecting ability can be attained. The sun sensor according to this invention can effectively solve all the problems occurring in the conventional analog type sun sensor using the periodic pattern reticle, such as ifficulty in enhancement of the precision due to diffusion and diffraction effects of sunlight, reduction in precision caused by an error occurring in the analog operation and increase in the size of the head; as well as the problems occurring in the digital type sun sensor having a combination of the CCD linear array sensor and slit, such as occurrence of error due to partial irregularity of the light receiving elements and increase in the size and weight of the head involved at the time of enhancing the precision. Thus, the sun sensor of this invention can attain high precision and smaller size.

Further more, it is possible to filter an output signal of CCD linear array sensor 12 in order to eliminate noise components. However, in such case, it is necessary to compensate for the time delay due to the filtering operation.

Figure 10:
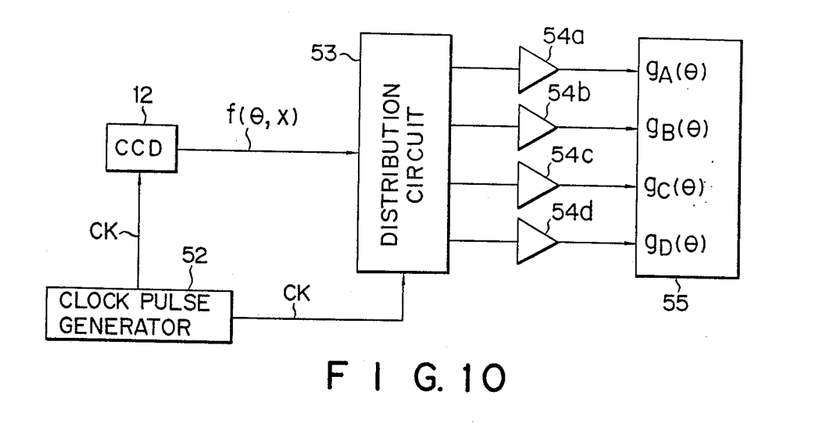
FIG. 10 being block diagram showing the construction of a signal processing section.

Another embodiment of this invention will now be described, with reference to FIGS. 10 and 11.

Since the head of the sun sensor of this embodiment has the same construction as that of FIG. 7, a description thereof will be thus omitted except for the fact that light-transmission sections "a" and light-shading sections "b" of reticle 11 are formed so as to have sufficiently narrow widths which allow sunlight S to be sufficiently diffracted when passing through light-transmission sections "a" and cause CCD linear array sensor 12 to generate a time series signal substantial to the sine waveform.

The signal processing section of the sun sensor according to this embodiment will now be described in detail, with reference to FIG. 10. In FIG. 10, numeral 52 denotes a clock pulse generator for generating transfer-driving clock pulse CK shown in FIG. 7, which in turn sequentially drives CCD linear array sensor 12. CCD linear array sensor 12 generates a time series signal which is then supplied to distribution circuit 53. Distribution circuit 53 forms a first gate signal of square wave having a period corresponding to the widths of light-transmission sections "a" and light-shading sections "b" of reticle 11, on the basis of transfer-driving clock pulse CK, and forms second to fourth gate signals having phase differences of 90°, 180°, and 270° with respect to the first gate signal, and then generates and distributes time series signals in accordance with the gate signals. Distributed time series signals from circuit 53 are respectively supplied to integrators 54a to 54d via band-pass filters (not shown) and the integrated outputs from the integrators are supplied to operation circuit 55 as aforementioned signals $g_A(\theta)$, $g_B(\theta)$, $g_C(\theta)$ and $g_D(\theta)$. Operation circuit 55 has substantially the same construction as the operation circuit of FIG. 2, and therefore the explanation thereof is omitted.

Now, the operation of the circuit with the construction described above is explained with reference to FIG. 11.

Figure 11:
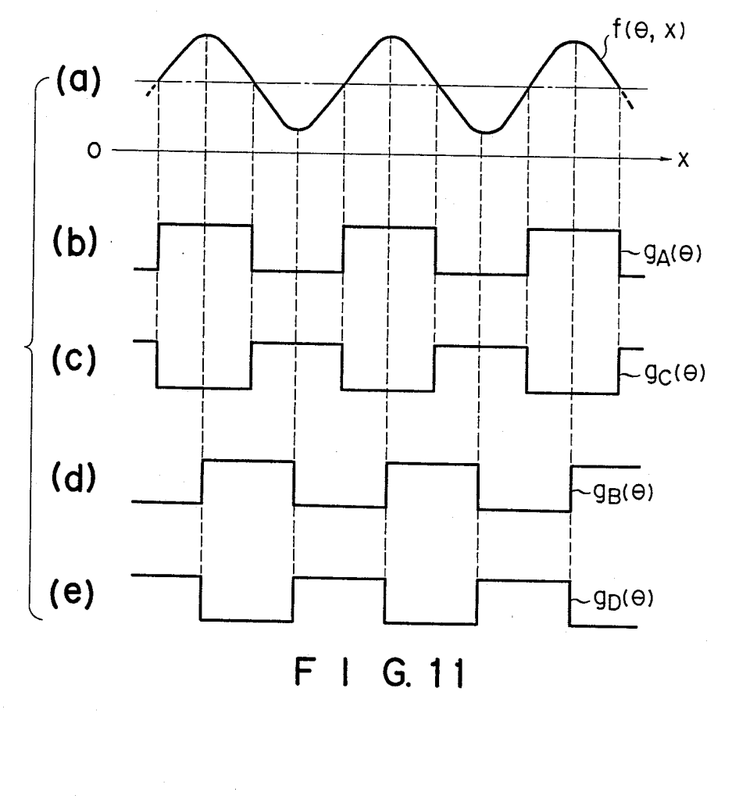
FIG. 11 being a diagram illustrating means for an azimuth.

As shown in FIG. 11(a), time series signal $f(\theta, x)$ (where, x indicates the direction of CCD's sensing line) representing the light intensity distribution is generated in the form of sine wave from CCD linear array sensor 12 of the head, and supplied to distribution circuit 53. As was earlier described, based on clock pulse CK, distribution circuit 53 forms first to fourth gate signals of square wave having the phase difference of 0°, 90°, 180° and 270° from one another and having a period corresponding to the widths of transmission sections "a" and shading sections "b" of reticle 11 as shown in FIGS. 11(b) to (e), and gate-controls the time series signal by use of the respective gate signals and generates the gated time series signals. In this way, distribution circuit 53 electrically performs the same function as the second reticle of light receiving sections A to D of the conventional sun sensor.

Time series signals "a" to "d", which are intermittently distributed by use of the gate signals, are respectively integrated by integrators 54a to 54d with respect to x. In this case, it is possible to provide band-pass filters preceding integrators 54a to 54d, so as to eliminate harmonic components, if necessary. The results of integration coincides with currents $g_A(\theta)$ to $g_D(\theta)$ which are derived by means of photoelectric converter 24 of light receiving sections A to D of the conventional sun sensor head shown in FIG. 1. Since in this invention, the signals are processed electrically, they can therefore be more precisely approximated to the sine wave with respect to $\theta$, in comparison with the conventional case. As a result, sunlight incident angle $\theta$ can be obtained with greater precision by supplying the results of integration as $g_A(\theta)$ to $g_D(\theta)$ to operation circuit 55 having the same construction as the operation circuit section shown in FIG. 2.

As described above, since the head of the sun sensor of this invention can be constructed only by a single reticle and CCD linear array sensor, it can be made small in size in comparison with the head of the conventional analog type sun sensor which has four light receiving sections A to D. Further, since the detected outputs representing the light intensity distribution can be precisely approximated to the sine wave, the operation processing of the sun sensor can be effected such that the incident angle of the sunlight can be derived with high precision.

Further, the sun sensor of the embodiment described above utilize CCD linear array sensor. However, it is also possible for it to use a two-dimensional CCD array sensor and accumulate more data, so that the random error is reduced and higher precision is achieved for the detection of the incident angle. Additionally an even higher precision may be achieved by slightly inclining the reticle, utilizing spatial light intensity distribution.

What is claimed is:

1. A sun sensor for measuring the incident angle of received sunlight, comprising:

a periodic pattern reticle having a plurality of band-form light-transmission sections and a plurality of band-form light-shading sections which are arranged in alternate fashion, permitting the sunlight to pass through said light-transmission sections arranged at regular intervals;

photoelectric converting means arranged under said reticle, to receive the sunlight which has passed through said light-transmission sections of said reticle, and including a plurality of light-receiving sections which are linearly arranged to store charges corresponding to the amount of received light;

transfer pulse-generating means for generating pulse signals to transfer the charges stored in the light-receiving sections of said photoelectric converting means;

reference phase signal-generating means for generating a reference phase signal of a period corresponding to the width and intervals of said light-transmission sections, based on the pulse signal generated from said transfer pulse-generating means; and means for detecting the incident angle of the sunlight whereby the phase reference between the reference phase signal from said reference phase signal-generating means and the time series signal transferred and output from said photoelectric converting means is output from which the incident angle of the sunlight can be determined.

2. A sun sensor according to claim 1, wherein said light-receiving sections of said photoelectric converting means are charge-transfer elements.

3. A sun sensor according to claim 1, wherein the widths of the light-transmission sections and light-shading sections of said reticle are set equal to each other.

4. A sun sensor for measuring the incident angle of received sunlight, comprising:

a periodic pattern reticle having a plurality of band-form light-transmission sections and a plurality of band-form light-shading sections which are arranged in alternate fashion, permitting the sunlight to pass through said light-transmission sections arranged at regular intervals;

photoelectric converting means arranged under said reticle, to receive the sunlight which has passed through said light-transmission sections of said reticle, and including a plurality of light-receiving sections which are linearly arranged to store charges corresponding to the amount of received light;

transfer pulse-generating means for generating pulse signals to transfer the charges stored in the light-receiving sections of said photoelectric converting means;

reference phase signal-generating means for generating a reference phase signal whose polarity is inverted at an interval corresponding to the width and interval of said light-transmission sections, based on the pulse signal generated from said transfer pulse-generating means;

error voltage-detecting means for receiving a reference phase signal generated from said reference phase signal-generating means and a time series signal generated from said photoelectric converting means, multiplying the received signals by each other, and integrating the result of multiplication to detect an error voltage corresponding to the phase difference between the phases of the two received signals; and means for detecting the incident angle of the sunlight whereby the phase shift of the reference phase signal is controlled by the error voltage detected by means of said error voltage detecting means, which in turn sets the error voltage to zero and outputting the amount of phase shift of the reference phase signal is output as incident angle of the sunlight.

5. A sun sensor according to claim 4, wherein said light-receiving sections of said photoelectric converting means are charge-transfer elements.

6. A sun sensor according to claim 4, wherein the widths of the light-transmission sections and light-shading sections of said reticle are set equal to each other.

7. A sun sensor for measuring the incident angle of received sunlight, comprising:
- a periodic pattern reticle having a plurality of band-form light-transmission sections and a plurality of band-form light-shading sections which are arranged in alternate fashion, permitting the sunlight to pass through said light-transmission sections arranged at regular intervals;
- photoelectric converting means arranged under said reticle, to receive the sunlight which has passed through said light-transmission sections of said reticle, and including a plurality of light-receiving sections which are linearly arranged to store charges corresponding to the amount of received light;
- transfer pulse-generating means for generating pulse signals to transfer the charges stored in the light-receiving sections of said photoelectric converting means;
- distributing output means for generating first to fourth gate signals of a period corresponding to the widths and the intervals of said light-transmission sections and light-shading sections, based on the pulse signal generated from said transfer pulse-generating means, the second to fourth gate signals having phase differences of 90°, 180°, and 270° respectively, and gate-controlling the time series signal generated by said photoelectric converting means, by use of the first to fourth gate signals, to divide the time series signal into first to fourth time series signals and output them;
- first to fourth integrating mean for integrating the first to fourth time series signals supplied from said distributing output means, respectively; and
- sunlight incident-angle calculating means for calculating an incident angle of the sunlight, based on the first to fourth integrated signals from said first to fourth integrating means.

8. A sun sensor according to claim 1, wherein said sunlight incident-angle calculating means comprises:
- a first subtracter, for deriving, from said first and third integrating means, a difference between the first and third integrated signals;
- a second subtracter, for deriving, from said second and fourth integrating means, a difference between the second and fourth integrated signals;
- a reference signal generator for generating reference sine wave and cosine wave signals having the same phase angles which can be adjusted;
- a first multiplier, for multiplying an output signal of said first subtracter by the cosine wave signal of said reference signal generator;
- a second multiplier, for multiplying an output signal of said second subtracter by the sine wave signal of said reference signal generator;
- a third subtracter, for deriving a difference between the results of multiplication performed by said first and second multipliers;
- angle-control means for controlling the phase angle of the reference signal from said reference signal generator, in order to set the result of subtraction from said third subtracter to zero; and
- means for detecting the incident angle of the sunlight based on the angle of the reference signal from said reference signal generator when the output signal from said third subtracter is zero.

9. A sun sensor according to claim 7, wherein said light-receiving sections of said photoelectric converting means are charge-transfer elements.

10. A sun sensor according to claim 7, wherein the widths of the light-transmission sections and light-shading sections of said reticle are set equal to each other.

* * * * *